US008876082B1

(12) United States Patent
Beringer

(10) Patent No.: US 8,876,082 B1
(45) Date of Patent: Nov. 4, 2014

(54) BOTTLE FILL VALVE ACTUATOR

(76) Inventor: Bernie Beringer, Gray, TN (US)

( * ) Notice: Subject to any disclaimer, the term of this patent is extended or adjusted under 35 U.S.C. 154(b) by 899 days.

(21) Appl. No.: 12/387,667

(22) Filed: May 6, 2009

Related U.S. Application Data

(60) Provisional application No. 61/194,105, filed on Sep. 24, 2008.

(51) Int. Cl.
*F16K 31/44* (2006.01)

(52) U.S. Cl.
USPC ........... 251/263; 251/251; 251/275; 251/276; 251/277; 251/278

(58) Field of Classification Search
USPC .................. 251/251, 263, 275, 276, 277, 278
See application file for complete search history.

(56) References Cited

U.S. PATENT DOCUMENTS

| | | | | | |
|---|---|---|---|---|---|
| 1,940,549 | A | * | 12/1933 | Jones | 68/12.22 |
| 3,380,628 | A | * | 4/1968 | Cox, Jr. | 222/1 |
| 3,860,028 | A | * | 1/1975 | Moore et al. | 137/411 |
| 4,086,943 | A | * | 5/1978 | Fernandez | 141/39 |
| 4,617,432 | A | * | 10/1986 | Hanssen et al. | 200/81 R |
| 4,903,731 | A | * | 2/1990 | Pappy | 137/624.11 |
| 5,119,853 | A | * | 6/1992 | Petri et al. | 141/39 |

* cited by examiner

*Primary Examiner* — Ryan Reis

(57) ABSTRACT

An actuator for operating a fill valve of a bottle filling machine, said actuator having a camshaft provided with a cam fork on its inner end adapted to engage cam follower means on a fill valve, and having a trip lever on its outer end adapted to engage a rotating shoulder means on a turntable of the machine, the camshaft being rotatable within a sleeve bearing, wherein a braking means comprising a helical wave spring is mounted over the camshaft to provide a desired frictional resistance to rotation of the camshaft within the bearing for preventing rotational drift of the cam fork from its desired operating position.

4 Claims, 3 Drawing Sheets

BOTTLE FILL VALVE ACTUATOR

This application claims priority under 35 U.S.C. 119(e)(1) based on Applicants Provisional U.S. Patent Application Ser. No. 61/194,105 filed 09-24-08 and titled "BOTTLE FILLER VALVE ACTUATOR".

BACKGROUND OF THE INVENTION

1. Field

This invention concerns cam operated actuators (fill valve openers) for use with fill valves for beverage bottles, cans or the like wherein each actuator employs a camshaft provided with O-ring seals which slidably rotatably mount the camshaft in the bore of an actuator barrel for rotative motion, and wherein a braking means is provided for preventing drift of the actuation during the container filling operation, which, for example, could prevent proper filling of the container, whereby the cam can contact a cam follower on the fill valve and urge the valve between a fully opened position and a fully closed position.

2. Prior Art

A typical bottle filling machine and its fill valve structure for which the present actuator is useful, and its operation are particularly shown in U.S. Pat. No. 5,119,853, and in general, in U.S. Pat. Nos. 6,038,833; 4,086,943; 5,586,379; 5,119,853; and in British patent 810,992, the disclosures of all of which patents are hereby incorporated herein by reference in their entireties.

Referring to FIG. 3 of U.S. Pat. No. 5,119,853, with parts numbers 18, 70, 74, 79, 80, 81, 82, 84 and 86 added herein without primes for clarity to FIG. 3, a typical prior cam assembly presently also termed "actuator" 86 is shown constructed such that it can be placed above each fill valve structure of, e.g., 79 or in other existing beverage fill machines with its cam fork 72' on the inner end portion 84 of camshaft 75' aligned with a cam follower shoulder pair (structure) 70, 74 on the fill valve 79. The cam fork 72' of the actuator is intended to open the fill valve structure of the filling head 81 it is associated with when the camshaft 75' is rotated in one direction to allow the proper amount of liquid to enter the can or bottle and then to close the fill valve when the camshaft is rotated in the opposite direction.

Further to said FIG. 3, such an assembly, heretofore, would utilize a braking means such as a coiled compression spring shown as item 80 of said patent, typically used with a brake pad 82 in order to prevent the actuator camshaft from drifting toward a more closed position. These prior braking means can only afford, at best, an approximate and variable frictional braking force which, even with the most attentive assembly procedure, often and unpredictably result in sticking, stopping, drifting or other jagged rotational motion of the actuator camshaft.

SUMMARY OF THE INVENTION

A fill valve cam operated actuator for use on a container filling machine, wherein a helical wave spring is used to provide a desired frictional resistance to rotation of the camshaft within its bearing means, whereby a greatly enhanced control and smoothness of operation of the actuator and improved drift resistance is achieved.

The invention further will be evident from the following drawings and description thereof wherein the various structures are not necessarily drawn to scale or in consistent proportions, and wherein.

Figures 1, 1A:
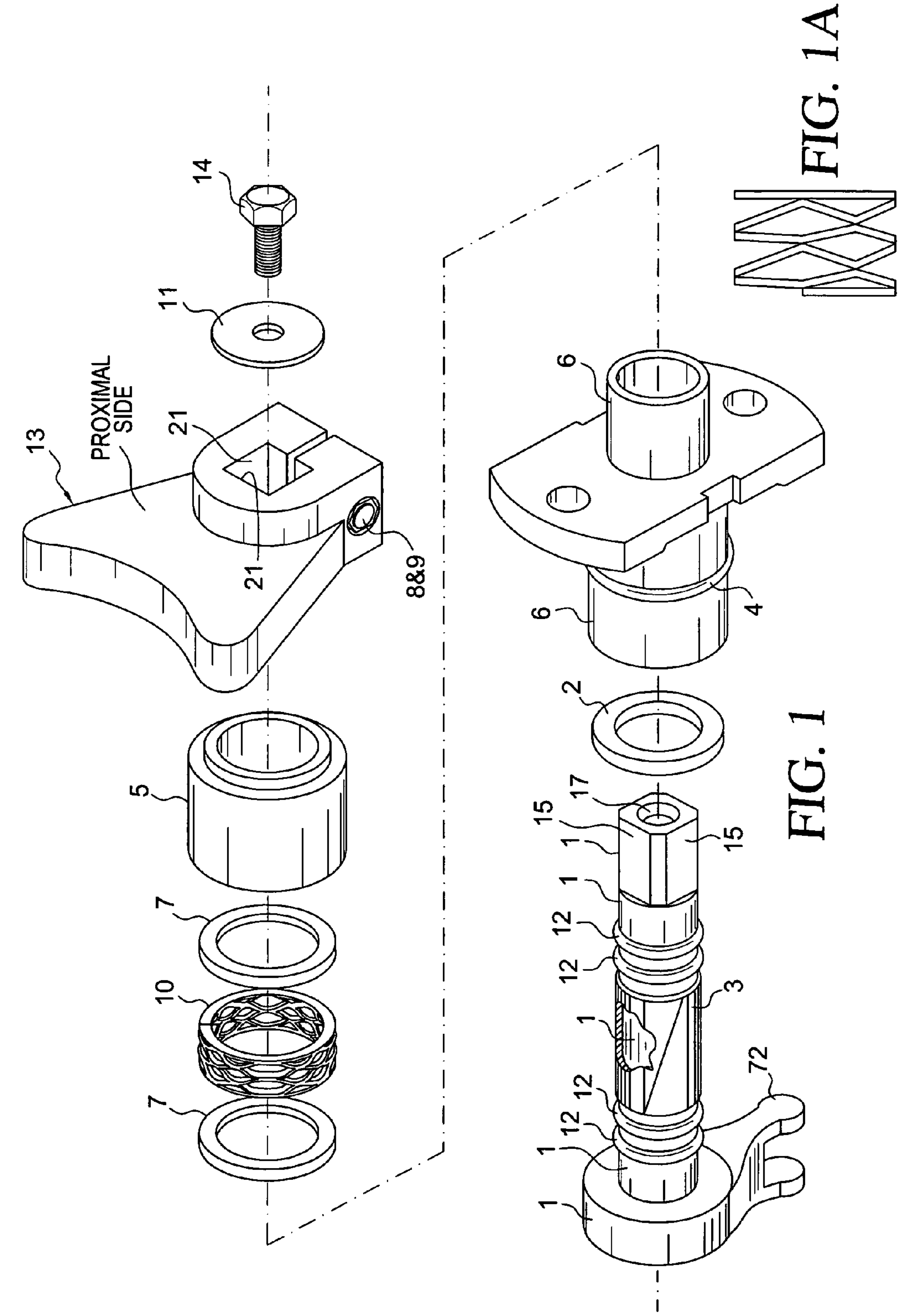
FIG. 1 is an exploded assembly perspective view of the present fill valve actuator structure.
FIG. 1A is a side view of the present helical wave spring.
Figure 3:
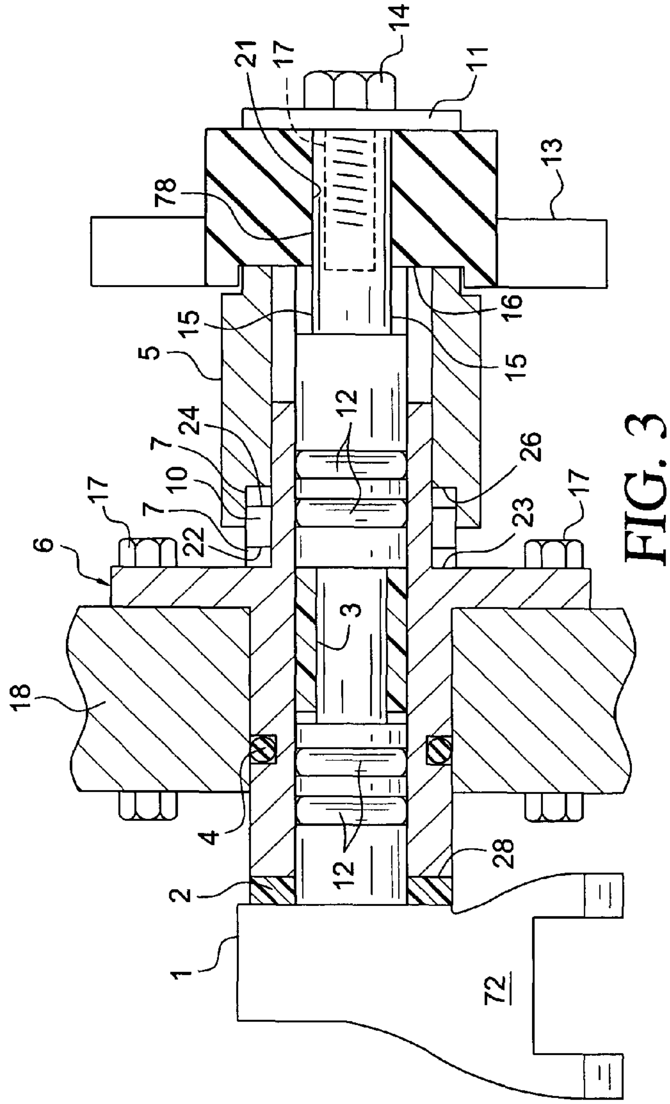
FIG. 3 is a cross-sectional view of the present actuator structure mounted on a wall of the product bowl of a filling machine with a middle portion of the camshaft sectioned.
Figure 3A:
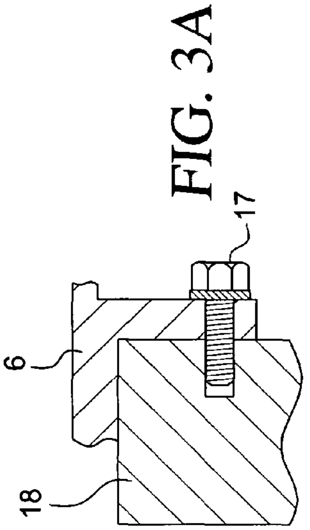
FIG. 3A is a variation of securing the actuator to the bowl wall.
Figure 1B:
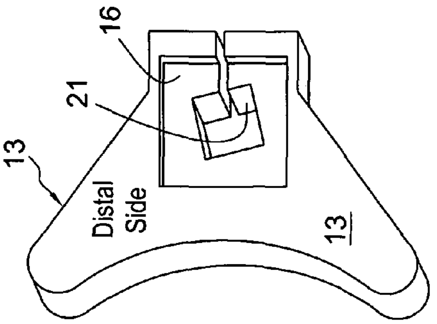
FIG. 1B is a distal side view of the present trip lever.

FIG. 3 PRIOR ART is taken from U.S. Pat. No. 5,119,853 with the some characters on page 1 hereof added for clarification purposes.

Figure 2:
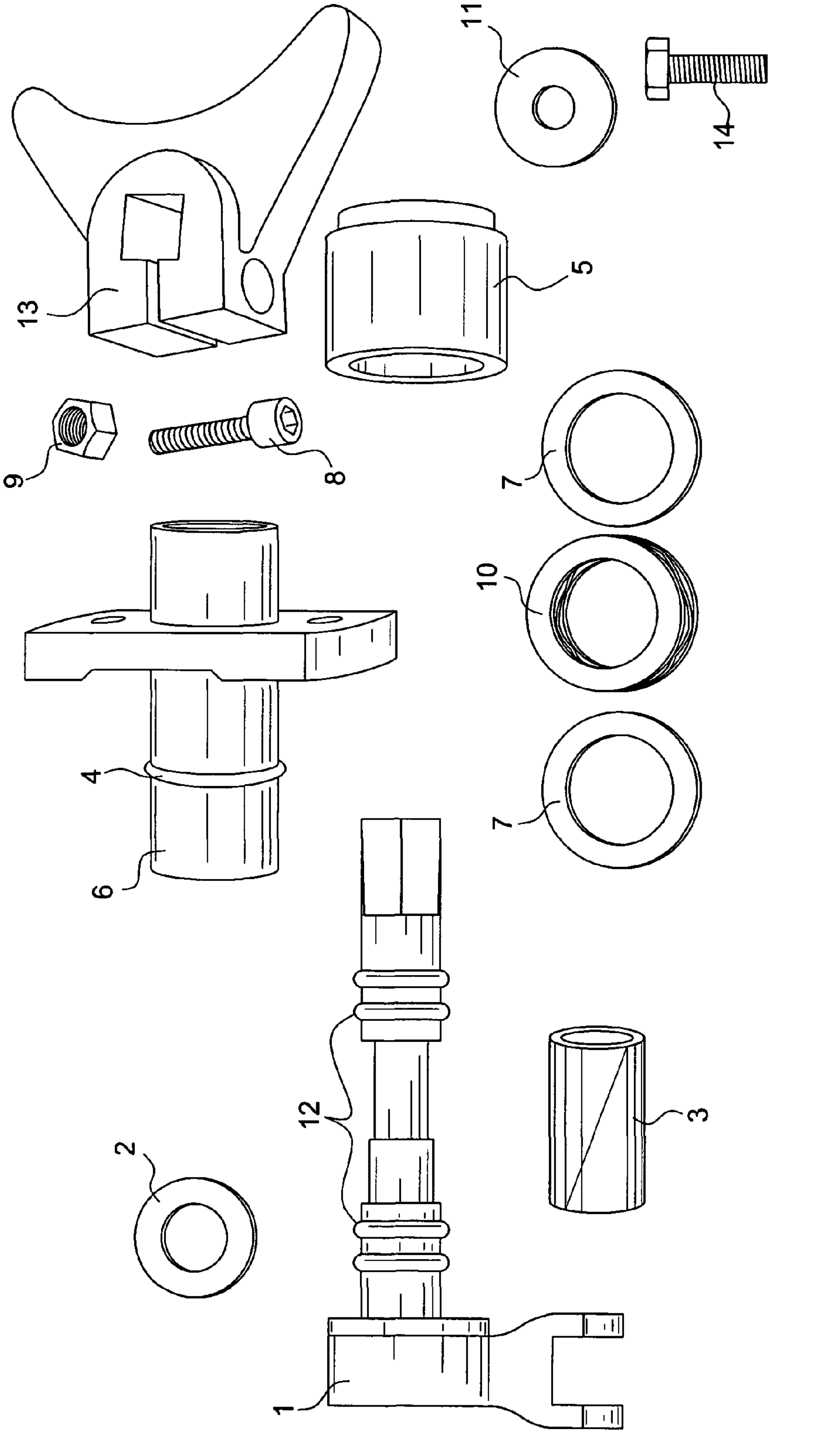
FIG. 2 is a view of the separate parts of the present actuator structure.

Referring to the drawings, particularly to FIG. 2, and with reference to the claims herein, the present actuator structure generally designated 20 (fill valve opener), in a preferred embodiment, comprises the following structural items:

| ITEM # | Quantity | Description |
|---|---|---|
| 1 | 1 | Camshaft |
| 2 | 1 | Pressure Ring (Nylon, Teflon or the like) |
| 3 | 1 | Bearing Sleeve (Nylon, Teflon, or the like) - Split Sleeve |
| 4 | 1 | O-Ring |
| 5 | 1 | Spring Spacer |
| 6 | 1 | Bearing Means |
| 7 | 1 | Spacer (Nylon, Teflon or the like washer) |
| 8 | 1 | Socket Head Screw |
| 9 | 1 | Nut |
| 10 | 1 | Spring (Special) Helical Wave |
| 11 | 1 | Washer - flat steel |
| 12 | 2 | O-Ring |
| 13 | 1 | Lever |
| 14 | 1 | Hex head Bolt |
| 15 | 4 | Flats |
| 16 | 1 | Recess, square or round |
| 17 | 1 | Bolt or screw |
| 18 | 1 | Bowl wall |
| 72 | 1 | Cam Fork |

With reference to the drawings herein, the present invention in a preferred embodiment comprises an actuator structure 20 for a fill valve 79 of a container filling machine which has a housing providing a liquid product bowl, which actuator structure has bearing means 6 adapted for mounting thru a wall 18 of said bowl and having a rotatable camshaft means 1 mounted therethrough, said camshaft means having a fill valve operating cam structure 72 on its inner end portion 73 engageable with cam follower means 70, 74 on said fill valve and further having a trip lever means 13, 5 on its outer end 78 engageable with a shoulder means (not shown) on a turntable of said machine for rotating said camshaft means, a friction brake structure having a helical wave spring 10 mounted around said camshaft means and having an inner face 22 bearing against an intermediate portion 23 of said bearing means and having an outer face 24 bearing against an inner portion 26 of said trip lever means, and axial force generating means 14, 17 engaging said trip lever means and said camshaft means and being operable to pull said cam structure 72 against an inner end portion 28 of said bearing means to compress said spring and provide a desired frictional resistance to rotation of said camshaft means within said bearing means.

Referring to the above description, it is noted that while the employment of pressure ring 2 and washer 7 are not critical to successful operation of the present actuator, their use is highly preferred in order to maximize smoothness and consistency of operation.

The present fill valve actuator has a unique braking system that eliminates compression springs as in the '853 patent, which springs often break and also eliminates fibrous or other composition broken brake pads that wear causing possible contamination from the brake dust and which also changes valve opening torques which cause bad filling due to drift of the trip lever. The present actuator provides a torque that is constant and made for a particular operation and is also a clean sanitary system with no fibrous brake pads which is and designed with the food industry in mind including accessibility for repair and clean-up. The torque can be changed to one's liking by changing the force of spring spacer 5 on spring 10 by tightening or loosening bolt 14 in threaded socket 17. It is noted that mating flats 15 on the camshaft and 21 on the trip lever allow the lever to slide on the shaft without rotating thereon.

The spring in use in the present invention can be used to attain consistent opening torques of, e.g., 10 inch pounds up to 20 inch pounds or more, preferably 11-12 inch pounds, and will resist angular deformation of the spring as the camshaft is rotated such as the deformation which normally occurs with springs as used in the U.S. Pat. No. 5,119,853 patent. It is noted that such deformation adversely affects the control one has over the frictional resistance to rotation of the camshaft required of the braking system. With too much torque associated parts will wear quickly or not operate at all. The helical wave spring used in this actuator will outperform other pre-existing designs.

SOME OF THE ADVANTAGES OF THE PRESENT ACTUATOR

1. Opening torques can be adjusted as desired;
2. Opening torques are more constant;
3. No worry about where brake pad dust is going;
4. No brake pads coming loose;
5. The braking system spring is of an alloy that outperforms even the finest grades of 302 Stainless and carbon steel springs;
6. Cleaner design making for no bacteria build ups;
7. Big cost saving item. No adjusting for wear needed. Will run a Minimum of one year without rebuilding. (Component rebuild is one-third the cost of conventional system);
8. Less wear and tear with proper opening torques on associated structures;
9. Easy installation.

The invention has been described in detail with particular reference to preferred embodiments thereof, but it will be understood that variations and modifications will be effected within the spirit and scope of the invention.

I claim:

1. In an actuator structure for a fill valve of a container filling machine which has a housing providing a liquid product bowl, a bearing means adapted for mounting thru a wall of a product bowl and having a rotatable camshaft means mounted therethrough, said camshaft means having a fill valve operating cam structure on its inner end portion engageable with cam follower means on the fill valve and further having a trip lever means on its outer end portion, the improvement comprising a brake structure having a helical wave spring mounted around said camshaft means and having an inner face bearing against an intermediate portion of said bearing means and having an outer face bearing against an inner portion of said trip lever means, and axial force generating means engaging said trip lever means and said camshaft means and being operable to pull said cam structure against an inner end portion of said bearing means to compress said spring and provide a desired frictional resistance to rotation of said camshaft means within said bearing means and wherein low friction washer means is interposed between all relatively movable metal parts of said actuator structure.

2. The actuator structure of claim 1 wherein said trip lever means is slidably adjustably mounted on said camshaft means, and said axial force generating means comprises a screw means passing thru said lever means and threaded axially into said outer end of said camshaft means, wherein said lever means has a spacer sleeve slidably mounted on said camshaft means and having an outer end which slidably rotationally engages lever means, said spacer sleeve having an inner end engaging said outer face of said spring whereby threading of said screw means further into said camshaft means will draw said cam structure more tightly against said bearing means to give a desired resistance to rotation of said camshaft means within said bearing means.

3. The actuator structure of claim 2 wherein inner end of said spacer sleeve is recessed at a radially inner portion and rotationally slidably receives outer end portions of said spring for preventing lateral deformation of said spring thru rotation of said lever means.

4. The actuator structure of claim 3 having a mounting flange means on said bearing means which is adapted to be affixed to a wall of the product bowl of the filling machine and wherein an O-ring seal is mounted on a portion of said peripheral exterior bearing means and is adapted to seal against aperture means in the product bowl wall thru which said bearing means is mounted.

* * * * *